US012655685B2

(12) United States Patent
Kirby

(10) Patent No.: US 12,655,685 B2
(45) Date of Patent: Jun. 16, 2026

(54) WINDOW TREATMENT HAVING A SPRING WRAP BRAKE

(71) Applicant: Lutron Technology Company LLC, Coopersburg, PA (US)

(72) Inventor: David A. Kirby, Zionsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 249 days.

(21) Appl. No.: 18/042,097

(22) PCT Filed: Aug. 18, 2021

(86) PCT No.: PCT/US2021/046546
§ 371 (c)(1),
(2) Date: Feb. 17, 2023

(87) PCT Pub. No.: WO2022/040339
PCT Pub. Date: Feb. 24, 2022

(65) Prior Publication Data

US 2023/0313611 A1 Oct. 5, 2023

Related U.S. Application Data

(60) Provisional application No. 63/067,210, filed on Aug. 18, 2020.

(51) Int. Cl.
*E06B 9/90* (2006.01)
*E06B 9/42* (2006.01)
*E06B 9/72* (2006.01)

(52) U.S. Cl.
CPC .................. *E06B 9/90* (2013.01); *E06B 9/42* (2013.01); *E06B 9/72* (2013.01); *E06B 2009/905* (2013.01)

(58) Field of Classification Search
CPC ..... E06B 9/90; E06B 9/72; E06B 9/42; E06B 2009/905
See application file for complete search history.

(56) References Cited

U.S. PATENT DOCUMENTS

2013/0190119 A1* 7/2013 Barnes .................. E06B 9/50
474/144
2016/0369558 A1 12/2016 Kirby
2018/0291684 A1* 10/2018 Berman .................. E06B 9/78
2019/0218859 A1* 7/2019 Campagna ................ E06B 9/90
2020/0248504 A1 8/2020 Risher

* cited by examiner

*Primary Examiner* — Beth A Stephan
(74) *Attorney, Agent, or Firm* — Michael S. Czarnecki; Glen R. Farbanish; Philip N. Smith

(57) ABSTRACT

Described herein are brake assemblies that may be useful for window treatments, such as spring-balanced motorized window treatments, including spring-balanced shades. The brake assemblies include brake springs of wire formed into a plurality of coils. The plurality of coils may terminate in a tang assembly, the tang assembly having a tang and a support portion. A support portion supports the tang when the tang is acted on by a force (e.g., a spring tightening or a spring loosening force). The support portion greatly reduces the hazard of the tang bending, because the tang is supported at each of its ends. With less chance of bending at the tang, a smaller wire diameter may be used for the brake spring, which creates less drag when rotating in a driven state. In the case of battery-driven shades, less drag saves battery life.

16 Claims, 7 Drawing Sheets

--PRIOR ART--

--PRIOR ART--

--PRIOR ART--

WINDOW TREATMENT HAVING A SPRING WRAP BRAKE

CROSS-REAFFERENCE TO RELATED APPLICATION

This application is the U.S. National Phase application of PCT International Application No. PCT/US2021/046546, filed on Aug. 18, 2021, which claims the benefit of U.S. Provisional Patent Application Ser. No. 63/067,210, filed Aug. 18, 2020, the entire disclosures of which are incorporated by reference herein.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows over which the roller shade is mounted. A typical window treatment may be mounted to a structure surrounding a window, such as a window frame. Such a window treatment may include brackets at opposed ends thereof. The brackets may be configured to operably support a roller tube, such that a flexible material may be raised and lowered. For example, the brackets may be configured to support respective ends of the roller tube. The brackets may be attached to a structure, such as a wall, ceiling, window frame, or other structure.

SUMMARY

Described herein are brake assemblies for window treatments employing motorized roller tube systems. Motorized roller tube systems may include a roller tube for winding (and unwinding) a flexible member, such as a shade fabric. A housing may be disposed in the roller tube and retains a motor, logical controls for the motor, a drive shaft for rotating a puck connected to the roller tube via a puck shaft, and a brake assembly. The motor may use AC power or DC power. Power may be supplied by wire or by battery. A brake assembly includes a mandrel, an input member coupled to the drive shaft and rotatable around the mandrel, an output member coupled to the puck shaft and rotatable around the mandrel, and a brake spring disposed upon the mandrel. A brake spring described herein comprises a plurality of coils, a tang extending from the plurality of coils, and a support portion extending from the tang, wherein when the motor is not actuated, the brake assembly prevents the flexible member from coming unwound.

Another brake assembly for a motorized roller tube system includes a mandrel and a brake spring disposed upon the mandrel, the brake spring comprising a plurality of coils, a tang extending from the plurality of coils, and a support portion extending from the tang, wherein, in a first rotational position, a force is exerted on the tang, thereby back driving the spring, causing the plurality of coils to tighten on the mandrel and prevent rotation therebetween.

A brake spring for a motorized roller tube system includes a plurality of coils having a tang assembly at either end, each tang assembly comprising a radially extending tang and a support portion extending from the tang. The tang receives several forces acting thereupon to affect a tension of the plurality of coils. For example, the tang may be acted on by a first force, for example, a locking force. For example, the tang may be acted on by a second force, for example, a driving force. The tang is supported at two points from stress incident to such a force being applied to the tang.

DETAILED DESCRIPTION

A motorized window treatment, such as a motorized roller tube system or shade, may comprise a roller tube and a flexible member or material, such as a window shade fabric, attached to the roller tube. Driving of the roller tube may cause the roller tube to windingly receive or release the flexible material. A motorized window treatment may further include a drive assembly that may drive the roller tube (e.g., rotate the roller tube such that the flexible material winds and unwinds onto and from the roller tube).

As the flexible member is wound onto the roller tube, the material of the flexible member may be formed into layers (or "windings"). A portion of the flexible member may wound onto the roller tube and another portion of the flexible member may hang from the roller tube (e.g., a pendant portion). When the pendant portion of the flexible member completely covers a window, the window treatment (e.g., shade) is said to be closed. When the pendant portion of the flexible member is at a maximum winding (e.g., completely wound onto the roller tube), the window treatment (e.g., shade) is said to be open. As can be appreciated, a plurality of positions between open and closed exist, each position having an associated pendant portion of the flexible member, with an associated weight that creates an associated load due to gravity.

Figure 1A:
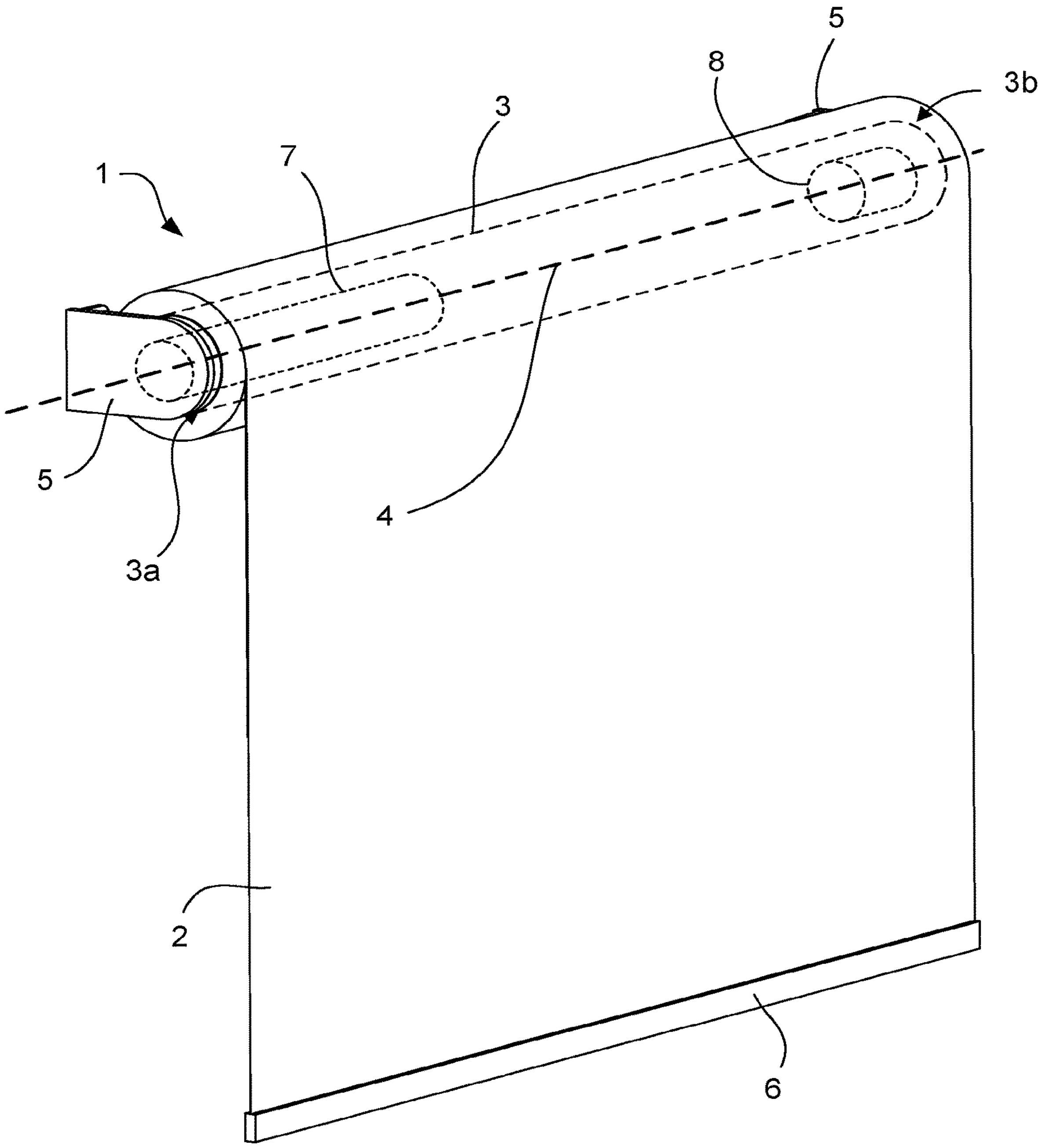
FIG. 1A is a perspective view of a motorized window treatment system.

FIG. 1A illustrates a perspective view of an example motorized window treatment, such as a motorized roller shade 1. The motorized roller shade 1 may include a covering material 2 (e.g., a flexible material, such as a shade fabric) windingly received around a roller tube 3. The roller tube 3 may extend from a first end 3*a* to a second end 3*b*.

A longitudinal axis 4 may extend from the first end 3*a* to the second end 3*b* of the roller tube 3. The roller tube 3 may be rotatably supported by mounting brackets 5, which may be attached to a structure adjacent a window (e.g., a wall or ceiling) that may be covered by the covering material 2. The roller tube 3 may be constructed of any appropriate material, such as, for example, aluminum, stainless steel, or plastic.

A hembar 6 may be connected to a lower edge of the covering material 2 and be oriented parallel to the lower edge of the covering material. The hembar 6 may be configured to weigh down the covering material 2. Rotation of the roller tube 3 about the longitudinal axis 4 may cause the covering material 2 to be wound or unwound from the roller tube to raise and lower the hembar 6.

The motorized roller shade 1 may comprise a motor drive unit 7 and an idler 8 that may each be configured to be connected to one of the respective mounting brackets 5. The motor drive unit 7 may be located inside of, or otherwise coupled to, the first end 3*a* of the roller tube 3 and the idler 8 may be coupled to the second end 3*b* of the roller tube. The motor drive unit 7 may include a motor (not shown) configured to rotate the roller tube 3 to adjust the covering material 2 between a fully-closed position and a fully-open position and may be configured to retain the covering material 2 at any position intermediate to the fully-closed position and the fully-open position. The idler 8 may be coupled to the roller tube 3 (e.g., at the second end 3*b*) to allow for rotation of the roller tube relative to the mounting brackets 5 as the motor drive unit 7 rotates the roller tube. The motor of the motor drive unit 7 may be any appropriate drive member, such as, for example, a DC motor, an AC motor, or a stepper motor. The motorized roller shade 1 may include one or more batteries (not shown) configured to power the motor drive unit 7. Alternatively, or additionally, the motor drive unit 7 may be configured to connect to an electrical system of a building in which the motorized roller shade 1 is installed. For example, the roller shade 1 may include an electrical cable configured to be connected to the electrical system. The motor drive unit 7 may further include a wireless communication circuit, such as a radio-frequency (RF) receiver or transceiver, for receiving wireless signals (e.g., RF signals). The motor drive unit 7 may be configured to raise and lower the hembar 6 to control the amount of daylight entering a space in response to a command received via the wireless signals.

Figure 1B:
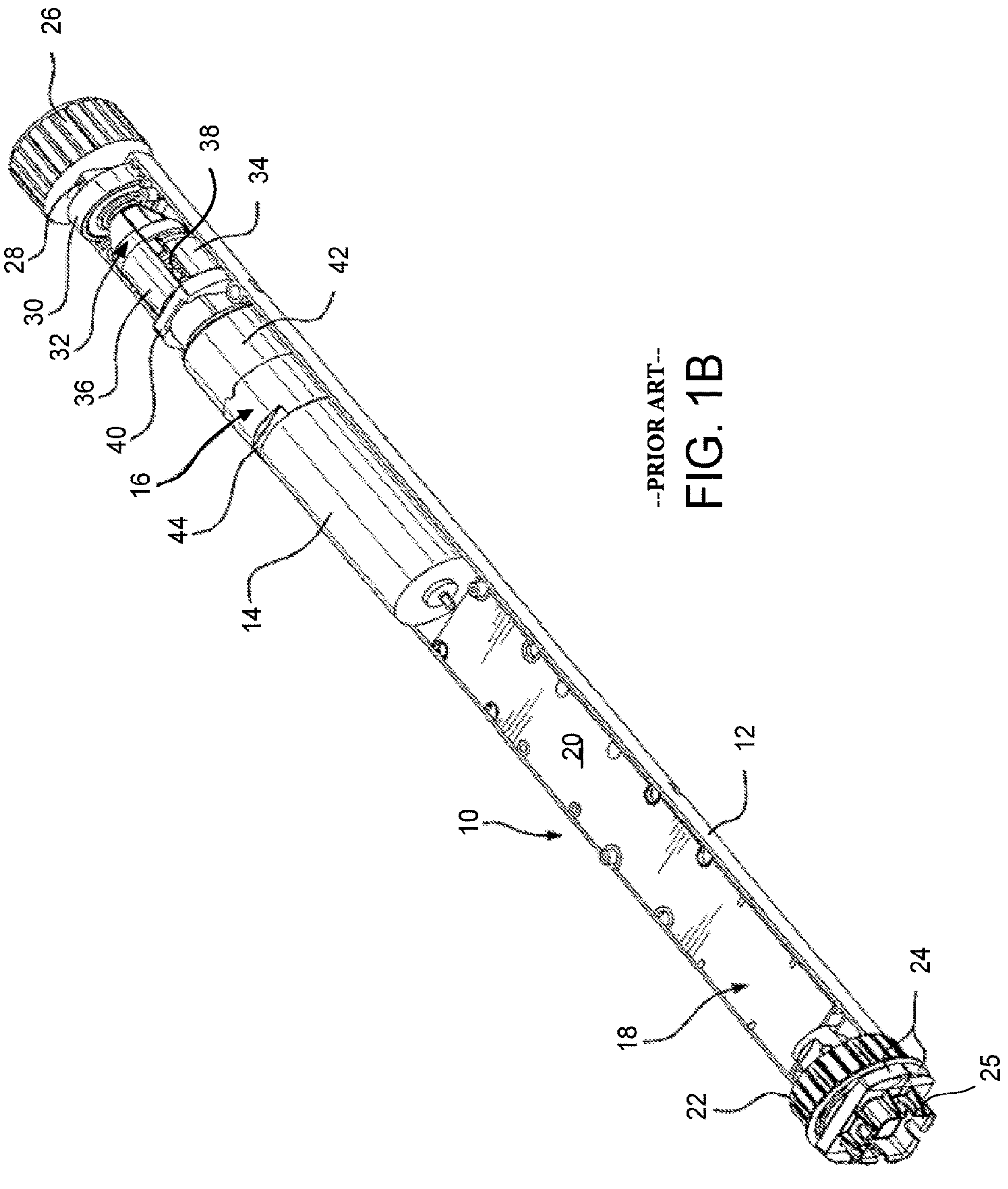
FIG. 1B is a perspective view of an example motor drive assembly for a motorized roller tube system with a portion of a housing removed.

Turning to FIG. 1B, a drive assembly 10 (also referred to herein as a motor drive unit) is shown, which may be disposed within a roller tube (not depicted for simplicity of illustration, but which may be similar to the roller tube 3 of FIG. 1A) for rotating the roller tube between various positions. The drive assembly 10 may include a housing 12 (also referred to herein as a motor drive unit housing). As illustrated, a portion (e.g., here a top portion) of the housing 12 has been removed. The drive assembly 10 may include a drive motor 14 and a gear assembly 16. The housing 12 may retain the drive motor 14 and the gear assembly 16. The drive assembly 10, and thus the drive motor 14, may be configured to receive power from a direct-current (DC) supply and/or an alternating-current (AC) supply. Power may be supplied by wire (e.g., connected to a power supply/source that is external to the motorized window treatment) or by a power supply/source that is integral with the motorized window treatment. For example, the integral power supply may be one or more batteries that may be disposed within the roller tube. As another or additional example, the power supply/source may be a photovoltaic power source, such as a solar cell.

The drive assembly 10 may further include an electronic drive unit 18 configured to control the operation of the drive motor 14. For example, the electronic drive unit 18 may receive commands (for example, ultimately from a user wishing to change a position of the flexible material), via a remote control unit or other external system controller, which result in operation of the drive motor 14. For example, a command may be received by the electronic drive unit 18 that causes the electronic drive unit to control the operation of the drive motor 14 to cause movement in a rotational direction that results in opening of the motorized window treatment. For example, a command may be received by the electronic drive unit 18 that causes the electronic drive unit to control the operation of the drive motor 14 to cause movement in a rotational direction that results in closing of the motorized window treatment. A printed circuit board 20 may be provided for mounting control circuitry (not depicted) of the electronic drive unit 18. The drive assembly 10 may further include a bearing sleeve 22 and bearing mandrels 24 that are disposed at a first end of the housing 12 of the drive assembly 10 for engaging an interior surface of a first end of the roller tube (not depicted) and that allow the roller tube to rotate relative to the housing 12 of the drive assembly. The drive assembly 10 may further include a mechanism 25 to interface or connect the housing 12 of the drive assembly to a mounting bracket (not depicted). According to one example, the housing 12 may be fixed/not rotate relative to the mounting bracket.

The drive assembly 10 may further include a drive puck 26 disposed at a second end of the housing 12. The drive puck 26 may include features (such as longitudinal grooves) to promote engagement between an outer surface of the drive puck 26 and an inner surface of a second end of the roller tube (not depicted) when the drive assembly 10 is received within the roller tube. The drive puck 26 may be fixably connected to a puck shaft 28 that is rotatably supported with respect to the housing 12 by a drive bearing 30. The puck shaft 28 may be operably connected to the gear assembly 16 such that actuation of the drive motor 14 rotates the gear assembly and thus the push shaft and thereby the drive puck 26. Drive puck 26 in turn rotates the roller tube, thus winding and unwinding, for example, the flexible member onto and off of the roller tube.

The drive assembly 10 may further include a brake assembly 32 that may be disposed in the housing 12 and that receives the puck shaft 28. Although a motorized window treatment may be balanced, for example, with counter springs to reduce the force required to wind the flexible member, as can be appreciated, it is not always possible to perfectly balance the flexible member's weight at all positions of the motorized window treatment. Accordingly, even spring-balanced motorized window treatments may require a brake assembly to hold the flexible member in a selected position. As will be discussed, the brake assembly 32 is engaged when the motor is not in use. When the motor is rotating a roller tube, for example, to a relatively more closed position of the shade or a relatively more open position of the shade, the brake assembly 32 is not engaged.

The brake assembly 32 may include a brake input 34, a brake output 36, a brake spring 38, and a brake mandrel 40 (also referred to herein as a mandrel). A portion of the mandrel 40 projects toward the drive puck 26 and is surrounded by the brake input 34, the brake output 36, and the brake spring 38. The mandrel 40 may be retained by the housing 12 and not rotate relative to the housing and may therefore also be referred to herein as the non-rotating mandrel. A gear cover 42 of the gear assembly 16 may be disposed adjacent to the brake mandrel 40. A motor adapter 44 may be disposed between the motor 14 and the gear cover 42 and may connect the output of the motor to the gear assembly 16. In operation, the puck shaft 28 may pass through the brake assembly 32, which may be adapted to engage the puck shaft to prevent relative rotation between the motor 14 and the drive puck 26 when the flexible member is not being wound/unwound (e.g., when the shade is not in use). It is understood that a load (e.g., a gravitational load) is applied to the roller tube due to a weight of an unwound portion of the flexible member (not depicted) and an optional hembar (if present). Engagement of the brake assembly 32 counteracts the load and prevents the flexible member from unwinding (e.g., when the shade is not in use).

Figure 1C:
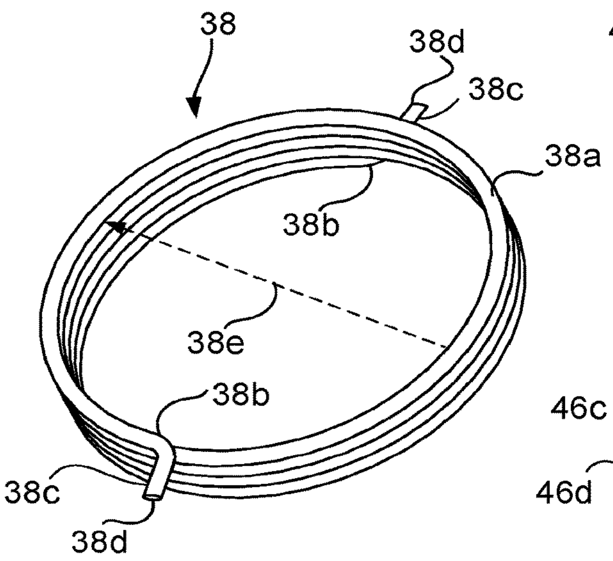
FIG. 1C is a perspective view of an example brake spring for the drive assembly of FIG. 1B.

Referring now to FIG. 1C, a brake spring 38 may be formed from wire (such as a single piece of wire) and may comprise a plurality of (e.g., two or more) wraps or coils 38*a*. Both a diameter of the wire and a number of wraps may have an effect on a brake drag force. The brake spring 38 may terminate at each respective end in a bend 38*b*, thereby creating a tang 38*c* having a distal end 38*d*. The brake spring 38 may be disposed on the non-rotating mandrel 40. The brake spring 38 may have an internal or inner diameter 38*e* defined by the innermost surface of the plurality of wraps 38*a*. When the spring is in a relaxed state, diameter 38*e* may be slightly smaller than the non-rotating mandrel 40 (FIG. 1B). The brake input 34 and the brake output 36 are each rotatable and adapted to engage at least one of the tangs 38*c* of the brake spring 38. When the brake input 34 is rotated in either direction, the brake input pushes on one or more of the tangs 38*c*, thereby relaxing the brake spring 38 (e.g., increasing the internal diameter defined by the plurality of wraps 38*a*). The brake spring 38 then slides on the non-rotating mandrel, allowing the brake output 36 to be driven by the brake input 34.

In the absence of rotation of the brake input 34, gravity may cause a load/force on the flexible member, which if unchecked, could result in unwinding and subsequent lowering of the position of the flexible member. In response, this load may cause the brake output 36 to push one or more of the tangs 38*c*, thereby "back driving" the brake spring 38. Back driving the brake spring 38 may cause a decrease in the internal diameter 38*e* defined by the plurality of wraps 38*a*, and the brake spring 38 may grip tightly onto the non-rotating mandrel 40, preventing rotation of the brake output 36 and thus puck shaft 28. As a result, the flexible member may be held in position by the brake assembly 32.

One problem with brake spring 38 is that the tangs 38*c* may, for example, bend such as at bend 38*b*. Each of the tangs 38*c* is essentially a cantilever, taking all the force when the brake spring 38 is back driven which may, for example, cause the tangs 38*c* to bend and thus cause the brake assembly to slip and the flexible member to undesirably move beyond the desired position. To compensate and prevent the tangs 38*c* from bending, heavier spring wire may be used to form the brake spring 38. However, heavier wire may cause the brake spring 38 to have significant drag (e.g., against the non-rotating mandrel) when the brake output is driven by the brake input 34 because it is more difficult for the brake input to relax the brake spring 38 (e.g., increasing the internal diameter 38*e* defined by the plurality of wraps 38*a*) and thereby for the brake spring 38 to slide on the non-rotating mandrel. This drag can cause energy efficiency problems, as one example. For example, in the case of battery-powered shades, when a brake spring like that of FIG. 1C is used, the operating friction between the brake spring 38 and non-rotating mandrel 40 can consume as much of the battery energy as moving the shade.

Accordingly, what is needed are improved brake assemblies for motorized window treatments employing, for example, motorized roller tube systems, including battery-powered shades, improved brake springs for the same, and methods of reducing brake drag force in brake assemblies of motorized window treatments.

Figure 2:
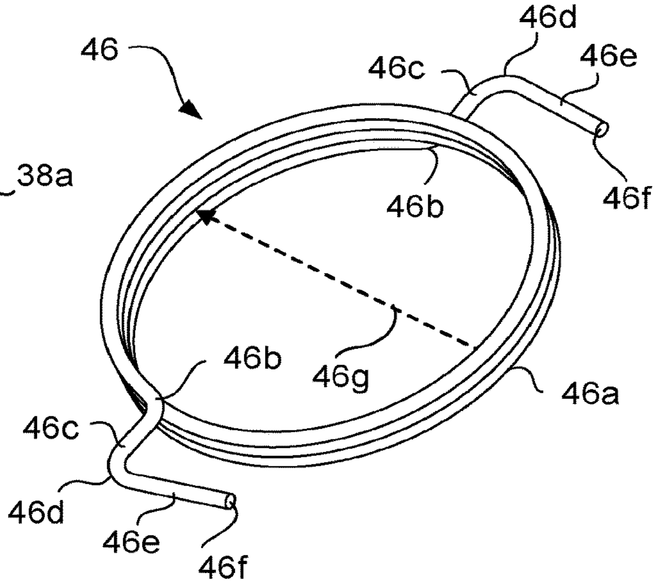
FIG. 2 is a perspective view of an example brake spring as disclosed herein.

FIG. 2 depicts a brake spring 46. The brake spring 46 may comprise wire formed into a plurality of coils 46*a*. The number of coils and the diameter of the wire may be determined based on desired drag for a shade application (such, for example, using Equations 1 and 2 described herein to determine the desired performance). The plurality of coils 46*a* may terminate at a first bend 46*b*, a tang 46*c*, a second bend 46*d*, a support portion 46*e*, and a tip 46*f* (46*b*-46*f* being collectively referred to as a tang assembly). A variety of shapes for tang assemblies are contemplated, for example, the tang assemblies of FIG. 2 and FIGS. 3-8 may be described as generally L-shaped.

The first bend 46*b* is configured such that the tang 46*c* extends radially from the plurality of coils 46*a*, which allows interaction with an input member or output member as will be described with respect to FIGS. 3-8. The brake spring 46 has an internal or inner diameter 46*g*. The internal or inner diameter 46*g* varies, depending on whether the brake spring 46 is in a relaxed state or a back-driven state.

As depicted, the tang assemblies 46*b*-46*f* are mirror images of each other and have substantially the same geometries. The relative circumferential position of the tang assemblies is dictated by the length of the wire (e.g., number of wraps) forming the brake spring 46. The second bend 46*d*, the support portion 46*e*, and the tip 46*f* are disposed after the tang 46*c*. The support portion 46*e* supports the tang 46*c* when the tang is acted on by a force. The support portion 46*e* may engage an input member (such as will be described as input member 62 or input member 92). The support portion 46*e* greatly reduces the hazard of the tang 46*c* bending (or even breaking), e.g., at first bend 46*b*, because the stress is shared between the first bend and the support portion. Having the tang 46*c* supported by the support portion 46*e* allows for the use of a smaller wire diameter for the brake spring 46, which creates less drag when rotating about the mandrel in a driven state.

Figure 3:
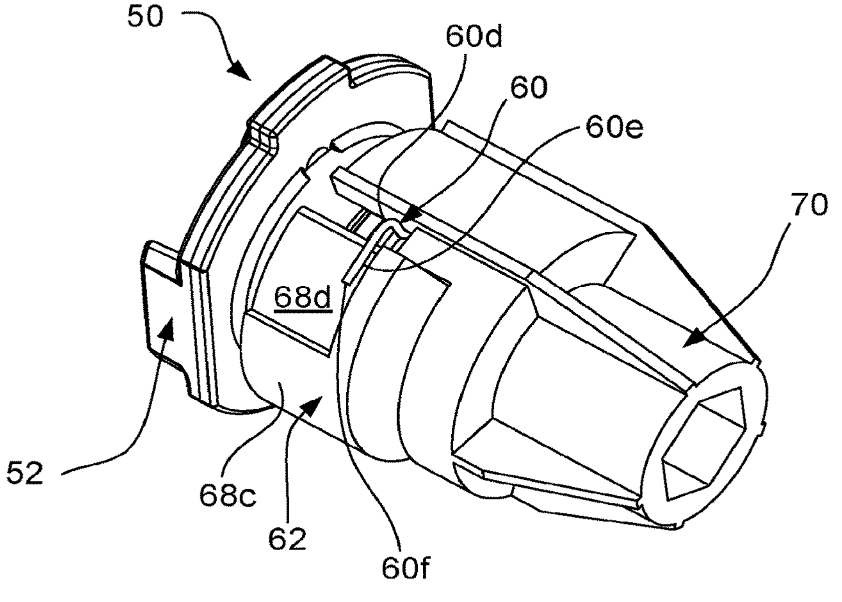
FIG. 3 is a perspective view of a brake assembly as disclosed herein for use in a motorized roller tube system.
Figure 4:
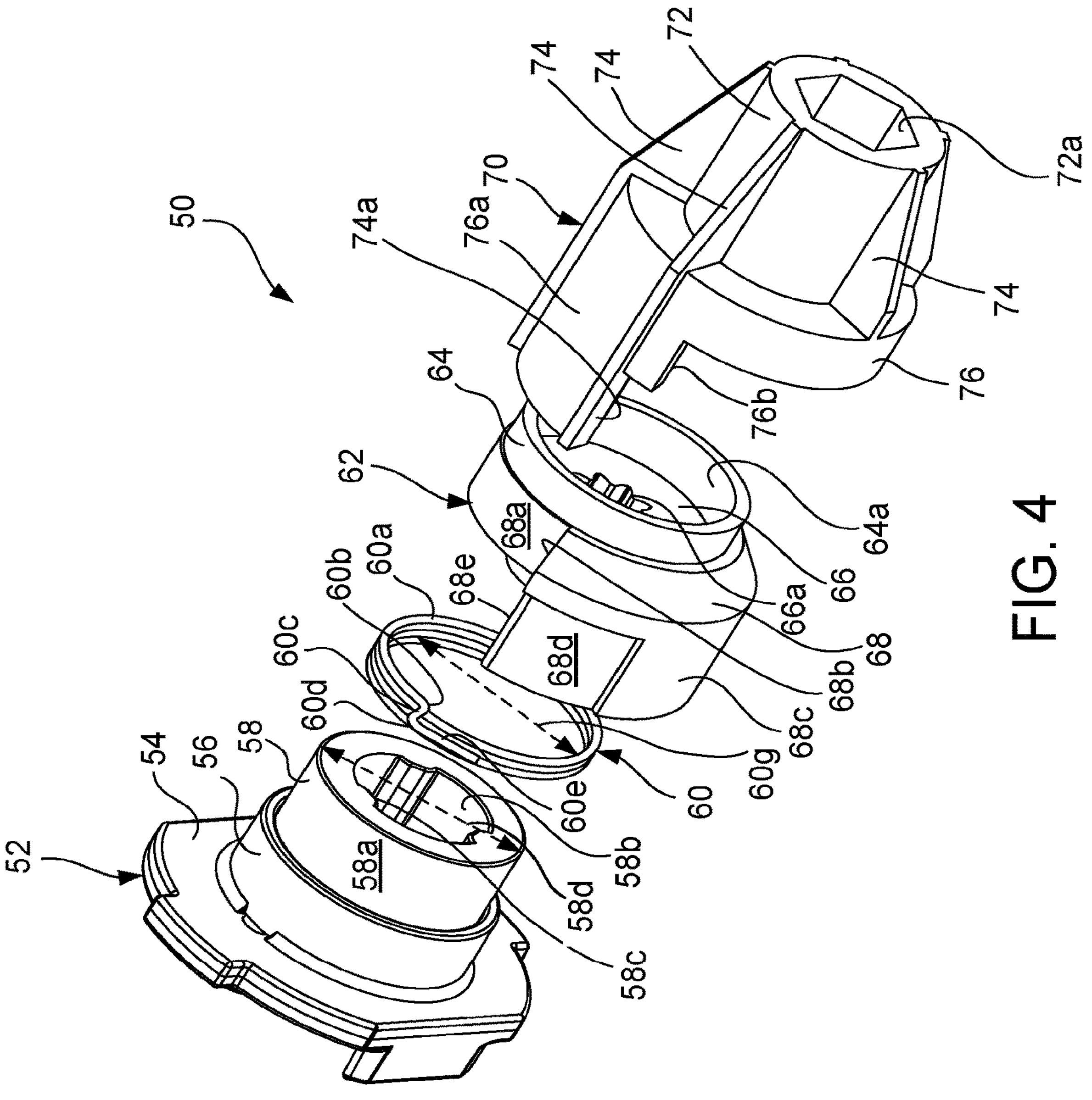
FIG. 4 is an exploded perspective view of the brake assembly of FIG. 3.

FIGS. 3 and 4 depict a brake assembly 50 that is adapted to be used in motorized window treatments, such as are associated with motorized roller tube systems. As one example, brake assembly 50 may be used within a drive assembly, such as in place of brake assembly 36 of drive assembly 10 of FIG. 1B. For description purposes only, drive assembly 10 (FIG. 1B) may be used in describing operation of the brake assembly 50. Engagement of the brake assembly 50 may counteract the gravitational load/force associated with the pendant portion of a flexible member and prevents the flexible member from unwinding when the window treatment is at rest (e.g., the motor is not being actuated).

The brake assembly 50 comprises a mandrel 52. The brake mandrel 52 may include a base 54, which may include features to aid attachment within a drive assembly, such as within a housing 12 of drive assembly 10 (FIG. 1B). Base 54 of brake assembly 50 may be fixably attached to housing 12 of drive assembly 10 such that the brake mandrel 52 does not rotate relative to the housing. In this fashion, the brake mandrel 52 may also be referred to herein as a non-rotating mandrel. A body 56 may extend from the base 54. The body 56 may be annular in shape. The body 56 may have a distal portion 58.

The distal portion 58 may also be one or more of annular in shape and coaxial with the body 56. The distal portion 58 may comprise an outer surface 58*a* for receiving a brake spring 60 (the brake spring 60 may be substantially similar to the brake spring 46 of FIG. 2). The distal portion 58 may also define a bore 58*b* which extends all the way through the brake mandrel 52. A plurality of ribs 58*c* (three are shown in FIG. 4, although there may be fewer or more than three) may be disposed within the bore 58*b*. The ribs 58*c* may extend parallel to an axis defined by the bore 58*b* and may extend, for example, for at least a length equally the length of the distal portion 58. As another example, the plurality of ribs 58*c* may extend the entire length of the bore 58*b* (e.g., a length of the bore represented by a length of the brake mandrel 52). A drive shaft (not depicted in FIGS. 3 and 4) pass through the bore 58*b*, but may not contact the plurality of ribs 58*c*, thereby allowing the drive shaft to spin freely within the brake mandrel.

The brake spring 60 may include a plurality of wraps or coils 60*a*. The brake spring may be disposed about the mandrel 52, positioned on the surface 58*a* of the body 56 of the mandrel. The brake spring 60 may have an internal or inner diameter 60*g* defined by the innermost surface of the plurality of coils 60*a*. When in a relaxed state, diameter 60*g* may be slightly smaller than diameter 58*d* of the distal portion 58 of body 56 (e.g., diameter 58*d* may extend to surface 58*a*). In a first rotational state, as will be described, the brake spring 60 may be tensioned (e.g., back driven) and may tightly engage the surface 58*a* of distal portion 58, preventing relative rotation between the brake spring 60 and the brake mandrel 52. In turn, this prevents the drive shaft, and thus the roller tube, from spinning, and thereby, the flexible member from unwinding, such as due to gravity, from the roller tube. Accordingly, the first rotational state of the brake spring 60 may be a nonrotational state with respect to the surface 58*a* of the mandrel 52.

In a second rotational state, as will be described, the brake spring 60 may be forcibly relaxed (e.g., driven open, thereby increasing inner diameter 60*g* of the brake spring), allowing relative rotation between the brake spring 60 and the mandrel 52, albeit with some associated drag, since diameter 60*g* may (e.g., may still) be slightly smaller than diameter 58*d* of the distal portion 58 of body 56. In this second rotational state, the motor 14 of the drive assembly 10 may drive/rotate puck shaft 28 and thus puck assembly 26 and the roller tube, thereby driving the flexible member to a new position, such that the window treatment is further opened or further closed. Accordingly, the second rotational state of the brake spring 60 may involve clockwise or counterclockwise rotation of the brake spring with respect to the surface 58*a* of the mandrel 52, and may be referred to as a driven state.

The brake spring 60 may comprise wire formed into the plurality of coils 60*a*. A diameter (e.g., thickness) of the wire and a number of coils (e.g., wraps) may be determined based on a desired application, for example, using Equation 1 (drag to lower the shade, e.g., at a constant speed) and Equation 2 (drag to lift the shade):

$$T_w=(EH^4\Delta D^2PI)*(e^{2\pi N\mu}-1)/32(D+h)^4 \quad \text{Eq. 1}$$

$$T_u=(EH^4\Delta D^2PI)*(1-e^{-2\pi N\mu})/32(D+h)^4 \quad \text{Eq. 2}$$

wherein:

E=Modulus of Elasticity of the Brake Spring h=Wire Diameter

D=Mandrel Outer Diameter (OD)

$I=1/4*\pi(h/2)^4$

Δ=Mandrel Outer Diameter (OD)—Spring Inner Diameter (ID)

N=Number of Wraps

μ=Coef. of Friction

For example, viewing FIG. 4, the Mandrel Outer Diameter (OD) may be a diameter between the two furthest separated points of the surface 58*a* (e.g., diameter 58*d*). For example, the Spring Inner Diameter may refer to diameter 60*g* defined between the innermost surfaces of the plurality of coils 60*a*. The coefficient of friction may be between the mandrel material and the wire material.

The plurality of coils 60*a* may end in a radial first bend 60*b*. As depicted, the first bend 60*a* may be a perpendicular or 90 degree bend, but as will be appreciated, the first bend may be a gradual curve or a series of curves. A tang 60*c* may extend from the first bend 60*b*. A second bend 60*d* may be disposed at an end of the tang 60*c*, e.g., after the tang. The second bend 60*d* may be opposite the first bend 60*b*. As depicted, the second bend 60*d* may be a perpendicular or 90 degree bend, but as will be appreciated, the second bend may be a gradual curve or a series of curves. A support portion 60*e* may be disposed after the second bend 60*d*, the support portion terminating in a tip 60*f* (see FIG. 3) which is the distal end of the brake spring 60.

The support portion 60*e* may support the tang 60*c* when the tang is acted on by a force. The force may act on a portion of the tang 60*c* or substantially all of the tang. Examples of forces acting upon the tang 60*c* may include a first force applied to back drive the plurality of coils 60*a*, thereby causing diameter 60*g* of the spring to contract and the coils to engage the surface 58*a* of the mandrel 52, and a second force applied to relax the plurality of coils, thereby causing diameter 60*g* of the spring to expand and the coils to slip with respect to the surface 58*a* of the mandrel.

As discussed with reference to brake spring 38 of FIG. 1C, tangs (e.g., tangs 38*c*) acted as cantilevers and were susceptible to bending, for example, at the bend (e.g., bend 38*b*) which formed the tang. A bent tang may result in a flexible member slowly unwinding to a fully closed position, for example, after being set to a position, which may annoy consumers. The support portion 60*e* greatly reduces the forces on tang 60*c* and thus preventing tang 60*c* from bending, e.g., at first bend 60*b*, because the stress is shared between the first bend and the support portion 60*e*. In addition, having the tang 60*c* supported by the support portion 60*e* may allow for the use of a smaller wire diameter for the brake spring 60, which may create less drag when the spring 60 is rotating about the mandrel in the driven state. Less drag requires less effort from a motor, which may improve battery life, which is one consideration/advantage for battery-powered shades.

The first bend 60*b*, the tang 60*c*, the second bend 60*d*, the support portion 60*e*, and the tip 60*f* may be collectively referred to as a tang assembly. Although only one tang assembly is visible in FIGS. 3 and 4, it is understood that there may be a substantially similar arrangement on the other end of the plurality of coils 60*a* (see, e.g., FIG. 2). In some embodiments, the tang assemblies may be mirror images of each other (e.g., the other one points in the opposite direction, for example, if one tang assembly is pointing clockwise when viewed on end (e.g., along an axis defined by the mandrel distal portion 58), the other tang assembly is pointing counterclockwise). In some embodiments, the geometry of each of the tang assemblies is different. In any case, the relative circumferential position of the tang assemblies is dictated by the length of the wire (e.g., number of wraps) forming the brake spring 60.

The brake assembly 50 may further comprise an input member 62. The input member 62 may comprise an annular base 64 defining a bore 64*a*. A coupler 66 may be disposed in the bore 64*a*. The coupler 66 may define a bore 66*a* that is adapted to engage a drive shaft (not depicted in FIGS. 3 and 4) to rotate the input member 62 around an axis that is coaxial with the bore 66*a*. In a first direction of rotation of the drive shaft and thus input member 62, movement is imparted to a puck (for example, such as the drive puck 26 of FIG. 1B) which engages the roller tube such that the flexible member is wound about the roller tube and the flexible member is raised. In an opposite direction of rotation of the drive shaft and thus input member 62, the flexible member is unwound from the roller tube and the drive shaft and thus is lowered. For clarity, in both directions of rotation of the input member 62, the brake spring 60 is in the driven state, as will be described. The bore 66*a* may have features (e.g., splines) to engage the drive shaft, although other mechanisms may be used.

A body 68 may extend from the base 64 of the input member 62 in the direction of the brake spring 60 and the mandrel 52. The body 68 may be annular in shape. The body 68 may have a first surface 68*a*. An engagement surface 68*b* may be disposed on the body 68 for engaging a portion of an output member 70, the engagement surface being perpendicular to the surface 68*a*. A sidewall 68*c* may extend from the body 68 in the direction of the brake spring 60 and the mandrel 52. A recessed surface 68*d* may be adjacent to the sidewall 68*c* and be recessed or stepped down relative to the sidewall 68*c*. The recessed surface 68*d* may receive a portion of the brake spring 60, such as the support portion 60*e* and the tip 60*f* The recessed surface 68*d* may support the support portion 60*e* and the tip 60*f* of the brake spring 60, thereby reducing the stress on the first bend 60*b* imparted by a force acting on the tang 60*c*.

An edge 68*e* of the body 68 may be adjacent to the recessed surface 68*d* for engaging a portion of the brake spring 60, such as the tang 60*c*, when the brake assembly 50 is in the second rotational state. The input member 62 may be symmetrical, for example, it may have similar features disposed on the other side of the brake assembly 50 for engaging the other tang assembly.

As an example, when the motor of the motorized window treatment is actuated to raise or lower the flexible member, the drive shaft may rotate the input member 62. Rotation of the input member 62 may cause edge 68*e* to apply a force to the tang 60*c*, driving the brake spring 60, causing the brake spring to enlarge and disengage from (or at least slip with respect to) the surface 58*a* of the mandrel 52 (e.g., diameter 60*g* becoming larger), and allowing the drive shaft (and thus the puck, and thereby roller tube and flexible material) to freely rotate relative to the mandrel. Stress experienced by the first bend 60*b* of the brake spring 60 due to the force applied to the tang 60*c* may be partially offset by the support portion 60*e* engaging the recessed surface 68*d* of the input member 62.

The brake assembly 50 further comprises an output member 70. In some embodiments, unlike the spring 60 and input member 62, the output member 70 may not be symmetrical. However, it may be beneficial to have a symmetrical output member 70, for example, for universal compatibility with right-handed or left-handed configurations of window treatments.

The output member 70 comprises an annular base 72 defining a bore 72*a*. The bore 72*a* is adapted to receive a puck shaft (not depicted in FIGS. 3 & 4) which is coupled to a puck (for example, such as the drive puck 26 of FIG. 1B) which engages the roller tube. A plurality of ribs 74 may extend radially from the base 72. Several of the plurality of ribs 74 also extend axially in the direction of the input member 62, the brake spring 60, and the mandrel 52. The plurality of ribs 74 need not be identical; for example, the plurality of ribs may not all be the same length. An engagement surface 74*a* may be disposed on one of the plurality of ribs 74 for engaging the tang 60*c* of the brake spring 60 when the brake assembly 50 is in the first rotational state. For example, the input and output members may engage opposing sides of the tang 60*c*.

For example, when the motor of the motorized window treatment is not actuated, a gravitational load is applied to the roller tube due to a weight of an unwound (e.g., pendant) portion of the flexible member. This load is transferred to the puck, and thence to the output member 70 via the puck shaft. Rotation of the output member 70 causes the engagement surface 74*a* to apply a force to the tang 60*c*, back driving the brake spring 60, causing the brake spring to engage the surface 58*a* of the mandrel 52 (e.g., diameter 60*g* to become smaller), stopping the rotation of the brake spring, the output member, and the puck, and thereby preventing the flexible member from unwinding. Stress experienced by the first bend 60*b* of the brake spring 60 due to the force applied to the tang 60*c* is partially offset by the support portion 60*e* engaging the recessed surface 68*d* of the input member 62.

A body 76 extends from the base 72 of the output member 70 in the direction of the input member 62, the brake spring 60, and the mandrel 52. One or more of the plurality of ribs 74 are also attached to the body 76. A sidewall 76*a* extends axially from the body 76 in the direction of the input member 62, the brake spring 60, and the mandrel 52. The sidewall 76*a* may be disposed between a portion of the plurality of ribs 74. An engagement surface 76*b* may be disposed on the body 76, for example, on a side of a rib distal to sidewall 76*a*, for engaging the engagement surface 68*b* of the input member 62. When driven by the motor in a first rotational direction, the input member 62 rotates (clockwise as illustrated), causing engagement surface 68*b* to contact engagement surface 76*b* and the output member 70 to thus rotate, with the puck shaft imparting the output member's rotation to the puck, thereby winding or unwinding the flexible member depending on the rotational direction of the motor.

As seen in FIG. 3, the sidewall 68*c* and the recessed surface 68*d* of the input member 62 cover a portion of the plurality of coils 60*a*, a portion of the body 56 of the mandrel 52, and the distal portion 58. The support portion 60*e* and the tip 60*f* of the brake spring 60 engage the recessed surface 68*d*. The sidewall 76*a* of the output member 70 covers another portion of the plurality of coils 60*a*, a portion of the body 56 and the distal portion 58 of the mandrel 52, and the base 64 and the surface 68*a* of the input member 62. Due to the sidewall 68*c* and the recessed surface 68*d* of the input member 62 and the sidewall 76*a* of the output member 70 covering most of the plurality of coils 60*a*, only a portion of the tang 60*c*, the second bend 60*d*, the support portion 60*e*, and the tip 60*f* of the brake spring 60 are visible in FIG. 3.

In operation, as will be discussed, the brake assembly 50 is engaged when a motor is not in use. When the motor is rotating a roller tube, for example, to a relatively more closed position of the window treatment or a relatively more open position of the window treatment, the brake assembly 50 is not engaged. Although some drag is associated with the brake assembly 50, it is less than a conventional amount, such as may be experienced with a spring of FIG. 1C, for example (for example, because of the smaller diameter wire that springs with the described support portions may employ), and thus requires less energy to overcome. The brake assembly 50 may be particularly useful for battery-powered window treatments, such as battery-powered shades, including spring-balanced motorized window treatments (e.g., spring-balanced battery-powered shades). The brake assembly 50 may be associated with increased battery life for battery-powered window treatments.

In the first rotational state, the brake spring 60 is tensioned by the action of gravity acting on the flexible member, the engagement surface 74*a* of the output member 70 applying a force to the tang 60*c*, back driving the brake spring and causing the brake spring to engage the surface 58*a* of the mandrel 52, stopping the rotation of the brake spring, the output member, and the puck, and thereby preventing the flexible member from unwinding. In the second rotational state, a motor acts on the drive shaft (e.g., clockwise or counterclockwise), rotating the input member 62, causing the edge 68*e* to exert a force on the tang 60*c* of the brake spring 60, thereby relaxing the brake spring and allowing rotation of the brake spring, the output member 70 (through engagement surface 68*b* contacting engagement surface 76*b*), and the puck. Accordingly, the motor may drive the flexible member to a new position, such that the window treatment (e.g., flexible material) further opens or further closes.

Figure 5:
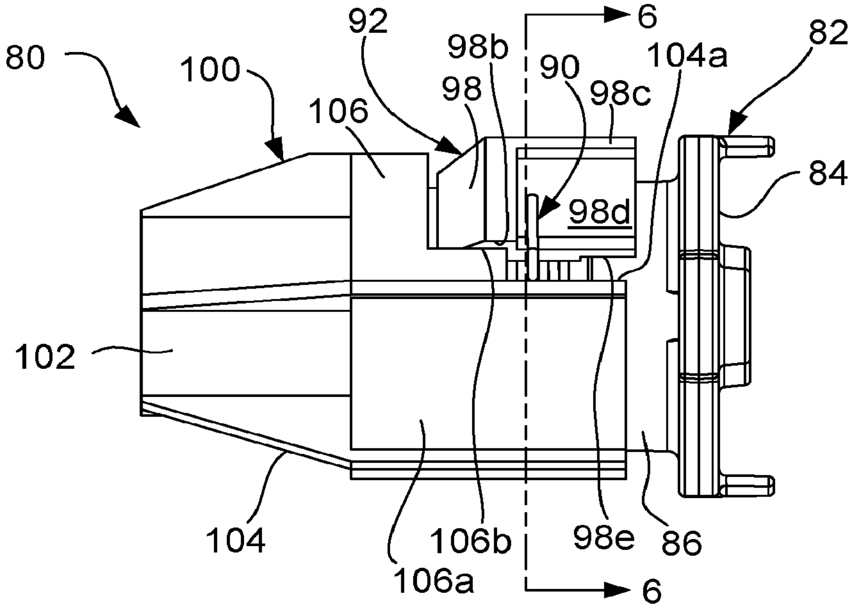
FIG. 5 is a side elevational view of a brake assembly as disclosed herein in a first rotational state.
Figure 6:
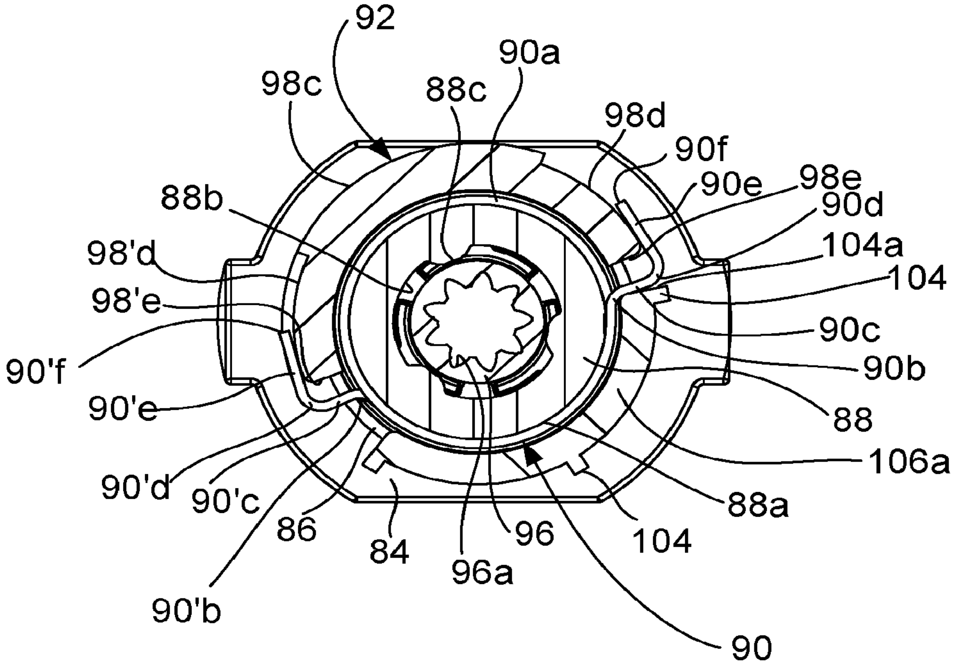
FIG. 6 is a cross-sectional view of the brake assembly of FIG. 5 through line 6-6.

FIGS. 5 and 6 depict a brake assembly 80 in the first rotational state, which may be referred to also as a locked state. The brake assembly 80 may be an example of the brake assembly 50 depicted in FIGS. 3 and 4. The brake assembly 80 may be installed in either end of a roller tube. For example, right-handed or left-handed configurations of window treatments exist (with reference to the disposition of the brake assembly 80 in the roller tube). A symmetrical design will be beneficial, as if installed on a right end of a roller tube, for example, a different tang assembly will act as a lock than if the brake assembly is installed on a left end of a roller tube, when the other tang assembly would act as the lock.

The brake assembly 80 comprises a mandrel 82. The mandrel 82 includes a base 84 and a body 86 extending from the base 84. The body 86 may have a distal portion 88 which comprises an outer surface 88*a* for receiving a brake spring 90. The distal portion 88 defines a bore 88*b*. A plurality of ribs 88*c* may be disposed within the bore 88*b* (three ribs are shown in FIG. 6) and extend parallel to an axis defined by the bore.

A brake spring 90 is positioned on the surface 88*a* of the distal portion 88 of the mandrel 82. In the first rotational state (depicted), the brake spring 90 is tensioned and tightly engages the surface 88*a*, preventing relative rotation between the brake spring 90 and the mandrel 82. The brake spring 90 may comprise wire formed into a plurality of coils 90*a*. The number of coils and the diameter of the wire may be determined based on the window treatment application (such, for example, using Equations 1 and 2 described herein to determine the desired performance). The plurality of coils 90*a* may terminate at a pair of tang assemblies, a first tang assembly comprising a first bend 90*b*, a tang 90*c*, a second bend 90*d*, a support portion 90*e*, and a tip 90*f* and a second tang assembly comprising a first bend 90'*b*, a tang 90'*c*, a second bend 90'*d*, a support portion 90'*e*, and a tip 90'*f*. As depicted, the tang assemblies are mirror images of each other and have substantially the same geometries. The relative circumferential position of the tang assemblies is dictated by the length of the wire (e.g., number of wraps) forming the brake spring 90. Any description relating to 90*b*-9*f* may also apply to 90'*a*-90'*f*, but only the former are discussed in the following for ease of explanation.

It is noted that the second bend 90*d*, the support portion 90*e*, and the tip 90*f* are disposed after the tang 90*c*. The support portion 90*e* supports the tang 90*c* when the tang is acted on by a force. The support portion 90*e* greatly reduces the tang 90*c* from bending, e.g., at first bend 90*b*, because the stress is shared between the first bend and the support portion. According to a further example, having the tang 90*c* supported by the support portion 90*e* may allow for the use of a smaller wire diameter for the brake spring 90, which creates less drag when rotating about the mandrel in a driven state. Less drag requires less effort from a motor, which improves battery life, a very important consideration for battery-powered window treatments.

Figure 8:
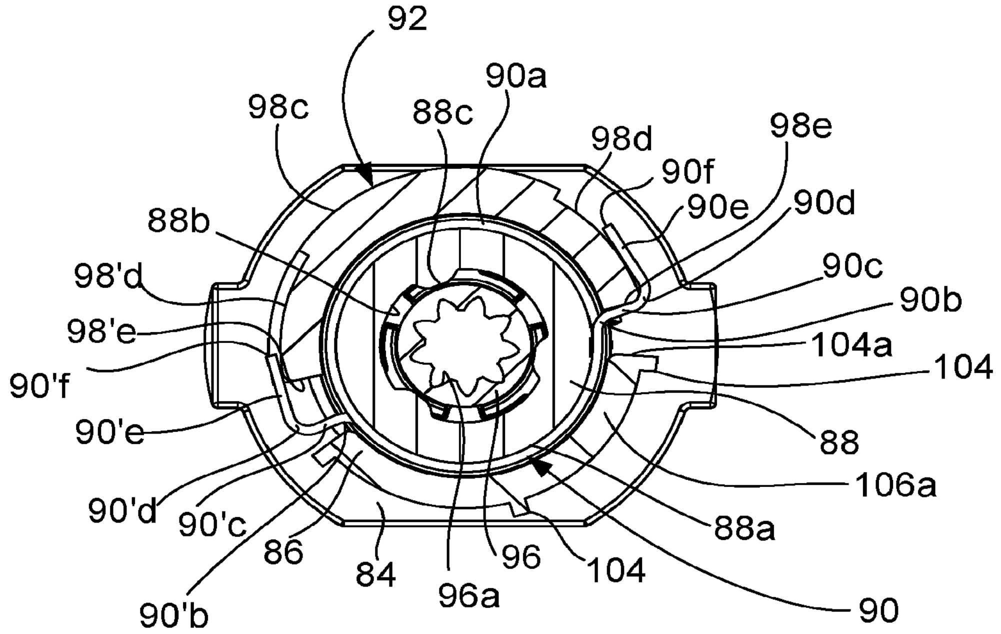
FIG. 8 is a cross-sectional view of the brake assembly of FIG. 7 through line 8-8.

The brake assembly 80 further comprises an input member 92. The input member 92 defines a bore (not visible) which retains a coupler 96 defining a bore 96*a* that is adapted to engage a drive shaft (not depicted). The drive shaft is adapted to be driven by the motor to rotate the input member 92; however, in the depicted first rotational state, the motor is not actuated. The input member 92 comprises a body 98 having a sidewall 98*c*. A recessed surface 98*d* is adjacent to and stepped down from the sidewall 98*c* for receiving the support portion 90*e* and the tip 90*f* of the brake spring 90. An edge 98*e* of the body 98 is adjacent to the recessed surface 98*d* for engaging a portion of the brake spring 90, such as the tang 90*c*, when the brake assembly 80 is in a second rotational state (FIG. 8). As illustrated, the input member 92 is symmetrical, and thus has a recessed surface 98'*d* and edge 98'*e*, e.g., to accommodate the second tang assembly comprising the first bend 90'*b*, the tang 90'*c*, the second bend 90'*d*, the support portion 90'*e*, and the tip 90'*f*.

The brake assembly 80 further comprises an output member 100. The output member 100 comprises an annular base 102 defining a bore (not visible in FIGS. 5 and 6) which is adapted to receive a drive shaft (not depicted) which may be coupled to a puck (such as the drive puck 26) which engages the roller tube (not depicted). A plurality of ribs 104 may extend radially from the base 102. Several of the plurality of ribs 104 may also extend axially in the direction of the input member 92, the brake spring 90, and the mandrel 82. An engagement surface 104*a* may be disposed on one of the plurality of ribs 104 for engaging the tang 90*c* of the brake spring 90 when the brake assembly 80 is in the first rotational state (FIG. 6).

A body 106 extends from the base 102 in the direction of the input member 92, the brake spring 90, and the mandrel 82. The plurality of ribs 104 are also attached to the body 106. A sidewall 106*a* extends axially from the body 106 in the direction of the input member 92, the brake spring 90, and the mandrel 82. The sidewall 106*a* may be disposed between a portion of the plurality of ribs 104. An engagement surface 106*b* may be disposed on the body 106 for engaging an engagement surface 98*b* (FIG. 5) of the body 98 of the input member 92.

In operation, a gravitational load is applied to the roller tube due to a weight of an unwound (e.g., pendant) portion of the flexible member. This load is transferred to the puck, and thence to the output member 100 via a drive shaft, such as the puck shaft 28 (FIG. 1B). Rotation of the output member 100 causes the engagement surface 104*a* to apply a force to the tang 90*c*, back driving the brake spring 90, causing the plurality of coils 90*a* to engage the surface 88*a* of the mandrel 82, stopping rotation of the brake spring, the output member, and the puck, and thereby preventing the flexible member from unwinding. Stress experienced by the first bend 90*b* of the brake spring 90 due to the force applied to the tang 90*c* is partially offset by the support portion 90*e* engaging the recessed surface 98*d* of the input member 92. The support portion 90*e* greatly reduces the forces of the tang 90*c* and thus preventing tang 90*c* from bending, e.g., at first bend 90*b*, because the stress is shared between the first bend and the support portion. The support portion 90*e* may slide along the recessed surface 98*d*.

Figure 7:
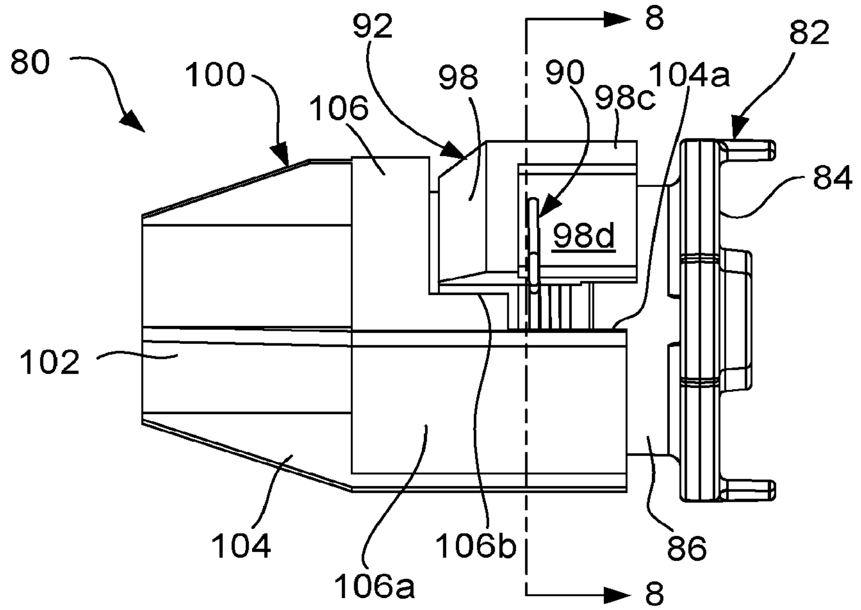
FIG. 7 is a side elevational view of a brake assembly as disclosed herein in a second rotational state.

FIGS. 7 and 8 depict the brake assembly 80, as previously described and using the same reference numerals, in the second rotational state, which may be referred to also as a driven state. The motor has driven the drive shaft to rotate the input member 92 (e.g., clockwise in FIG. 8). This causes the edge 98*e* of the input member 92 to exert a force on the tang 90*c* of the brake spring 90, thereby relaxing the brake spring (e.g., the inner diameter of the plurality of coils 90*a* increases in response to the force). The plurality of coils 90*a* slip with respect to the surface 88*a* of the mandrel 82, and allowing rotation of the brake spring 90, the output member 100, and the puck (not depicted). Accordingly, the motor may drive the flexible member to a new position, such that the window treatment further opens or further closes. The recessed surface 98*d* supports the support portion 90*e* of the brake spring 90, reducing stress placed on the first bend 90*b* by the force acting on the tang 90*c*.

Figure 9A:
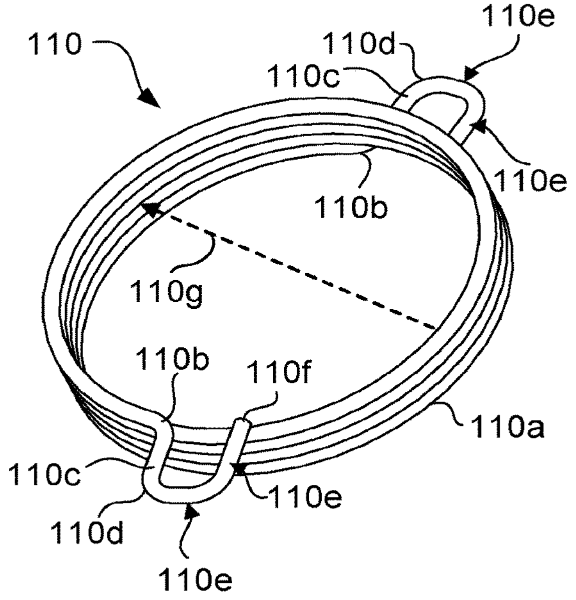
FIGS. 9A-9B are perspective views of example brake springs as disclosed herein.

FIG. 9A depicts a brake spring 110 according to another embodiment, which may be used in a brake assembly similar to those described herein. The brake spring 110 may comprise wire formed into a plurality of coils 110*a*. The number of coils and the diameter of the wire may be determined based on the window treatment application (such, for example, using Equations 1 and 2 described herein to determine the desired performance). The plurality of coils 110*a* may terminate at a pair of tang assemblies, each tang assembly comprising a first bend 110*b*, a tang 110*c*, and a second bend 110*d*. The second bend 110*b* is configured such that the tang 110*c* extends radially from the plurality of coils 110*a*. In this embodiment, the tang 110*c* may only interact with an output member. A support portion 110*e* and a tip 110*f* are disposed after the second bend 110*d*. The support portion 110*e* comprises two straight portions divided by a bend. The portion of the support portion 110*e* that is radial to the plurality of coils 110*a* (e.g., the portion parallel to the tang 110*c*) may engage, e.g., may only engage, an input member (such as at edge 98*e* of the input member 92 in FIG. 8). The tip 110*f* may engage an input member having a feature similar to the recessed portion (such as at recessed portion 98*e* of the input member 92 in FIG. 8) or, preferably, may engage a mandrel directly (such as surface 58*a* of the distal portion 58 of the mandrel 52 (FIG. 3)). The brake spring 110 may have an internal or inner diameter 110*g* defined by the innermost surface of the plurality of coils 110*a*. When in a relaxed state, the diameter 110*g* may be slightly smaller than a diameter of a mandrel it engages (e.g., as surface 58*a* of the distal portion 58 of the mandrel 52 (FIG. 3)).

As depicted, the tang assemblies are mirror images of each other and have substantially the same geometries. The relative circumferential position of the tang assemblies is dictated by the length of the wire (e.g., number of wraps) forming the brake spring 110. The second bend 110*d*, the support portion 110*e*, and the tip 110*f* are disposed after the tang 110*c*. The support portion 110*e* and the tip 110*f* support the tang 110*c* when the tang is acted on by a first force, for example, a locking force applied by an output member (such as at FIG. 6). The first bend 110*b* supports the support portion 110*e* when the support portion is acted on by a second force, for example, a driving force applied by an input member (such as at FIG. 8). Stress incident to a force (e.g., to affect the plurality of coils 110*a*) acting on a radial member (e.g., the tang 110*c* or support portion 110*e*) to affect the plurality of coils 110*a* is reduced because the stress is shared between two points. For example, stress is shared between the first bend 110*b* and the tip 110*f*. Having two points of support allows for the use of a smaller wire diameter for the brake spring 110, which creates less drag when rotating about the mandrel in a driven state. The tang assembly of FIG. 9A may be described as generally U-shaped.

Figure 9B:
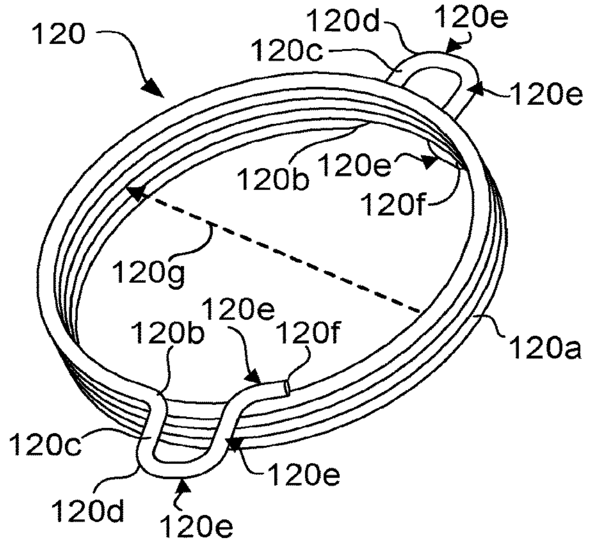

FIG. 9B depicts a brake spring 120 according to another embodiment, which may be used in a brake assembly similar to those described herein. The brake spring 120 may comprise wire formed into a plurality of coils 120*a*. The number of coils and the diameter of the wire may be determined based on the window treatment application (such, for example, using Equations 1 and 2 described herein to determine the desired performance). The plurality of coils 120*a* may terminate at a pair of tang assemblies, each tang assembly comprising a first bend 120*b*, a tang 120*c*, and a second bend 120*d*. The second bend 120*b* is configured such that the tang 120*c* extends radially from the plurality of coils 120*a*. In this embodiment, the tang 120*c* may only interact with an output member. A support portion 120*e* and a tip 120*f* are disposed after the second bend 120*d*. The support portion 120*e* comprises three straight portions divided by a pair of bends. The portion of the support portion 120*e* that is radial to the plurality of coils 120*a* (e.g., parallel to tang 120*c*) may engage, e.g., may only engage, an input member (such as at edge 98*e* of the input member 92 in FIG. 8). The portion of the support portion 120*e* that is adjacent to the plurality of coils 120*a* may engage an input member having a feature similar to the recessed portion (such as at recessed portion 98*e* of the input member 92 in FIG. 8) or may engage a mandrel directly (such as surface 58*a* of the distal portion 58 of the mandrel 52 (FIG. 3)). The tip 130*f* may engage an input member having a feature similar to the recessed portion. The brake spring 120 may have an internal or inner diameter 120*g* defined by the innermost surface of the plurality of coils 120*a*. When in a relaxed state, the diameter 120*g* may be slightly smaller than a diameter of a mandrel it engages (e.g., as surface 58*a* of the distal portion 58 of the mandrel 52 (FIG. 3)).

As depicted, the tang assemblies are mirror images of each other and have substantially the same geometries. The relative circumferential position of the tang assemblies is dictated by the length of the wire (e.g., number of wraps) forming the brake spring 120. The second bend 120*d*, the support portion 120*e*, and the tip 120*f* are disposed after the tang 120*c*. The support portion 120*e* supports the tang 120*c* when the tang is acted on by a first force, for example, a locking force. The first bend 120*b* supports the support portion 120*e* when the radial portion of the support portion is acted on by a second force, for example, a driving force. Stress incident to a force (e.g., to affect the plurality of coils 120*a*) acting on a radial member (e.g., the tang 120*c* or support portion 120*e*) is reduced because the stress is shared between two points. For example, stress is shared between the first bend 120*b* and the portion of the support portion 120*e* that is adjacent to the plurality of coils 120*a*. Having two points of support allows for the use of a smaller wire diameter for the brake spring 120, which creates less drag when rotating about the mandrel in a driven state. The tang assembly of FIG. 9C may be described as generally a-shaped.

Figure 9C:
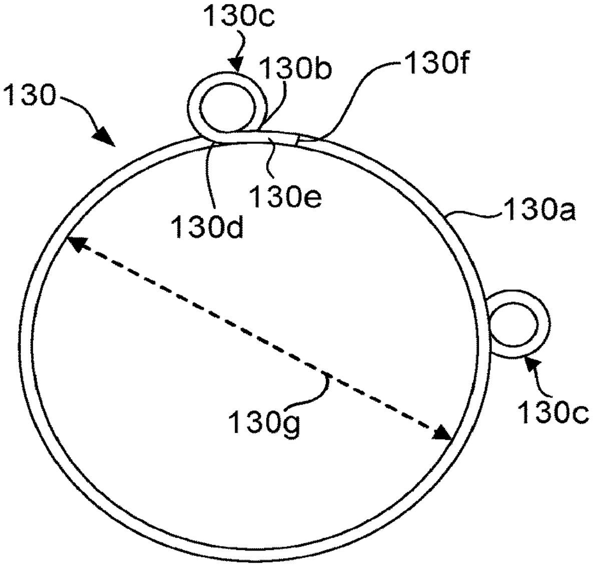
FIG. 9C is a plan view of an example brake spring as disclosed herein.

FIG. 9C depicts a plan view of a brake spring 130 according to another embodiment, which may be used in a brake assembly similar to those described herein. The brake spring 130 may comprise wire formed into a plurality of coils 130*a*. The number of coils and the diameter of the wire may be determined based on the window treatment application (such, for example, using Equations 1 and 2 described herein to determine the desired performance). The plurality of coils 130*a* may terminate at a pair of tang assemblies, each tang assembly comprising a first bend 130*b*, a tang portion 130*c*, and a second bend 130*d*. In this embodiment, the tang portion 130*c* may be shaped as a loop. The tang portion 130*c* may engage an output member on a first side and an input member on a second (e.g., opposing) side. A support portion 130*e* and a tip 130*f* are disposed after the second bend 130*d*. The support portion 130*e* may engage a mandrel (e.g., the same surface of a mandrel that may be engaged by the plurality of coils). The brake spring 130 may have an internal or inner diameter 130*g* defined by the innermost surface of the plurality of coils 130*a*. When in a relaxed state, the diameter 130*g* may be slightly smaller than a diameter of a mandrel it engages (e.g., as surface 58*a* of the distal portion 58 of the mandrel 52 (FIG. 3)).

As depicted, the tang assemblies are mirror images of each other and have substantially the same geometries. The relative circumferential position of the tang assemblies is dictated by the length of the wire (e.g., number of wraps) forming the brake spring 130. The second bend 130*d*, the support portion 130*e*, and the tip 130*f* are disposed after the tang 130*c*. The support portion 130*e* supports the tang 130*c* when the tang is acted on by a first force, for example, a locking force, or by a second force, for example, a driving force. Stress incident to a force (e.g., to affect the plurality of coils 130*a*) acting on the tang 130*c* is reduced because the stress is shared between two points. For example, stress is shared between the first bend 130*b* and the support portion 130*e*. Having two points of support allows for the use of a smaller wire diameter for the brake spring 130, which creates less drag when rotating about the mandrel in a driven state. The tang assembly of FIG. 9C may be described as generally O-shaped.

The foregoing detailed description has been disclosed with reference to specific embodiments. However, the disclosure is not intended to be exhaustive or to be limiting to the precise forms disclosed. Those skilled in the art will appreciate that changes could be made to the embodiments described above without departing from the broad inventive concept thereof. Therefore, the disclosure is intended to cover modifications within the spirit and scope of the disclosure as defined by the appended claims.

What is claimed is:

1. A brake assembly for a window treatment comprising a motorized roller tube system, the brake assembly comprising:

a mandrel;

a brake spring disposed upon the mandrel, the brake spring comprising a plurality of coils and a tang extending from the plurality of coils, the tang having a first bend at a first end of the tang adjacent the plurality of coils and a second bend at a second end of the tang, wherein a support portion extends from the second bend in a direction of rotation of the plurality of coils;

wherein, in a first rotational position, a first force is exerted on the tang, thereby back driving the spring, causing the plurality of coils to tighten on the mandrel and prevent rotation therebetween; and a second tang extending from the plurality of coils at a distal end of the plurality of coils and a second support portion extending from the second tang;

wherein, in a second rotational position, a second force is exerted on the second tang to overcome the first force, thereby causing the plurality of coils to loosen on the mandrel and allow rotation therebetween.

2. The brake assembly of claim 1, further comprising an output member, wherein the force is a gravitational force.

3. The brake assembly of claim 1, wherein, in a second rotational position, a second force is exerted on the tang to overcome the first force, thereby causing the plurality of coils to loosen on the mandrel and allow rotation therebetween.

4. The brake assembly of claim 3, further comprising an input member, wherein the second force is a motive force from a motor.

5. The brake assembly of claim 4, wherein the support portion engages the input member in both the first rotational position and the second rotational position.

6. A brake spring for a motorized roller tube system, the brake spring comprising:

a plurality of coils having a first tang assembly at a first end of the plurality of coils and a second tang assembly at a second end of the plurality of coils, each of the first tang assembly and the second tang assembly comprising a radially extending tang and a support portion extending from the tang to reduce stress on the tang;

wherein, in a first rotational position, a first force is exerted on the first tang assembly, thereby back driving the brake spring, reducing an internal diameter of the plurality of coils, to tighten the plurality of coils about a motorized roller tube disposed inside the plurality of coils and halt the rotation of the motorized roller tube; and wherein, in a second rotational position, a second force is exerted on the second tang assembly sufficient to overcome the first force, increasing the internal diameter of the plurality of coils to loosen the plurality of coils about a motorized roller tube disposed inside the plurality of coils and permit the rotation of the motorized roller tube.

7. The brake spring of claim 6, wherein the tang is supported at two points from stress incident to a force being applied to the tang.

8. The brake spring of claim 6, wherein each tang assembly further comprises a first bend extending between the plurality of coils and the tang and a second bend extending between the tang and the support portion.

9. The brake spring of claim 6, wherein the tang assembly is L-shaped, U-shaped, Ω-shaped, or O-shaped.

10. A window treatment, comprising:

a roller tube for winding a flexible member; and a drive assembly disposed in the roller tube, the drive assembly comprising a motor, an electronic drive unit, a drive shaft for rotating a puck connected to the roller tube via a puck shaft, and a brake assembly;

wherein the brake assembly comprises:

a mandrel;

an input member coupled to the drive shaft and rotatable around the mandrel;

an output member coupled to the puck shaft and rotatable around the mandrel;

a brake spring disposed upon the mandrel, the brake spring comprising:

a plurality of coils;

a tang extending from the plurality of coils; and a support portion extending from the tang in a direction of rotation of the plurality of coils to reduce stress on the tang;

a second tang extending from the plurality of coils at a distal end of the plurality of coils and a second support portion extending from the second tang;

wherein, when the motor is not actuated, the brake assembly prevents the flexible member from coming unwound; and wherein actuation of the motor exerts a force on the second tang, thereby causing the plurality of coils to loosen on the mandrel and allow rotation therebetween, allowing the flexible member to be unwound from the roller tube.

11. The window treatment of claim 10, wherein the motor is battery powered.

12. The window treatment of claim 10, when the motor is not actuated, a force is exerted on the tang, thereby back driving the spring, causing the plurality of coils to tighten on the mandrel and prevent rotation therebetween.

13. The window treatment of claim 12, wherein the force is a gravitational force exerted by a pendant portion of the flexible member.

14. The window treatment of claim 12, wherein, in a second rotational position, a second force is exerted on the tang to overcome the first force, thereby causing the plurality of coils to loosen on the mandrel and allow rotation therebetween.

15. The window treatment of claim 14, wherein the second force is a motive force.

16. The window treatment of claim 14, wherein the support portion engages the input member in both the first rotational position and the second rotational position.

* * * * *